(12) United States Patent
Iwamura

(10) Patent No.: US 6,276,416 B1
(45) Date of Patent: Aug. 21, 2001

(54) RUN-FLAT TIRE WITH PAIR OF RIGID RINGS IN SHOULDERS INSIDE CARCASS

(75) Inventor: Wako Iwamura, Kobe (JP)

(73) Assignee: Sumitomo Rubber Industries, Ltd., Hyogo-ken (JP)

( * ) Notice: Subject to any disclaimer, the term of this patent is extended or adjusted under 35 U.S.C. 154(b) by 0 days.

(21) Appl. No.: 09/359,788

(22) Filed: Jul. 26, 1999

(30) Foreign Application Priority Data

Jul. 27, 1998 (JP) .................................................. 10-210727

(51) Int. Cl.⁷ ........................................................ B60C 17/00
(52) U.S. Cl. ............................................. 152/517; 152/516
(58) Field of Search ...................................... 152/517, 516, 152/520, 165, 166, 192, 193, 195, 196–198, 200

(56) References Cited

FOREIGN PATENT DOCUMENTS

| 53-18104A | 2/1978 | (JP) . |
| 64-30809 | 2/1989 | (JP) . |
| 4154411 | 5/1992 | (JP) . |

*Primary Examiner*—Adrienne C. Johnstone
(74) *Attorney, Agent, or Firm*—Birch, Stewart, Kolasch & Birch, LLP

(57) ABSTRACT

A run-flat tire comprises a tread portion, a pair of sidewall portions, a pair of bead portions with a bead core therein, a carcass ply extending between the bead portions through the tread portion and sidewall portions and turned up around the bead cores to be secured thereto, and a pair of axially spaced rigid rings each disposed inside the carcass ply in one of shoulder regions. Each of the ring is embedded in a bulge of rubber formed on the inside of the tire.

7 Claims, 5 Drawing Sheets

RUN-FLAT TIRE WITH PAIR OF RIGID RINGS IN SHOULDERS INSIDE CARCASS

BACKGROUND OF THE INVENTION

1. Field of the Invention

The present invention relates to a pneumatic tire more particularly to a run-flat tire improved in run-flat performance.

2. Description of the Related Art

Run-flat tires of which sidewall portions are reinforced with hard rubber have a crescent sectional shape and are disclosed in the laid-open Japanese patent applications JP-A-53-18104, JP-A-64-30809 and JP-A-4-154411. Those tires are designed to support tire loads under a flat condition by the rigidity, especially bending rigidity of the sidewall portions between the road surface and the wheel rim. As a result, it is difficult to avoid some deterioration in ride comfort under normal conditions, as well as a great increase in the tire weight and a resultant deterioration in dynamic tire performance.

SUMMARY OF THE INVENTION

It is therefore, an object of the present invention to provide a run-flat tire from which the above-mentioned drawbacks are eliminated by simple and novel load supporting means.

According to the present invention a run-flat tire comprises a tread portion, a pair of sidewall portions, a pair of bead portions with a bead core therein, a carcass ply extending between the bead portions through the tread portion and sidewall portions and turned up around the bead cores to be secured thereto, and a pair of axially spaced rigid rings each disposed inside the carcass ply in one of the shoulder regions.

Preferably, each said ring is embedded in a bulge of rubber formed on the inside of the tire.

DESCRIPTION OF THE PREFERRED EMBODIMENTS

Embodiments of the present invention will now be described in detail in conjunction with the accompanying drawings.

Figure 1:
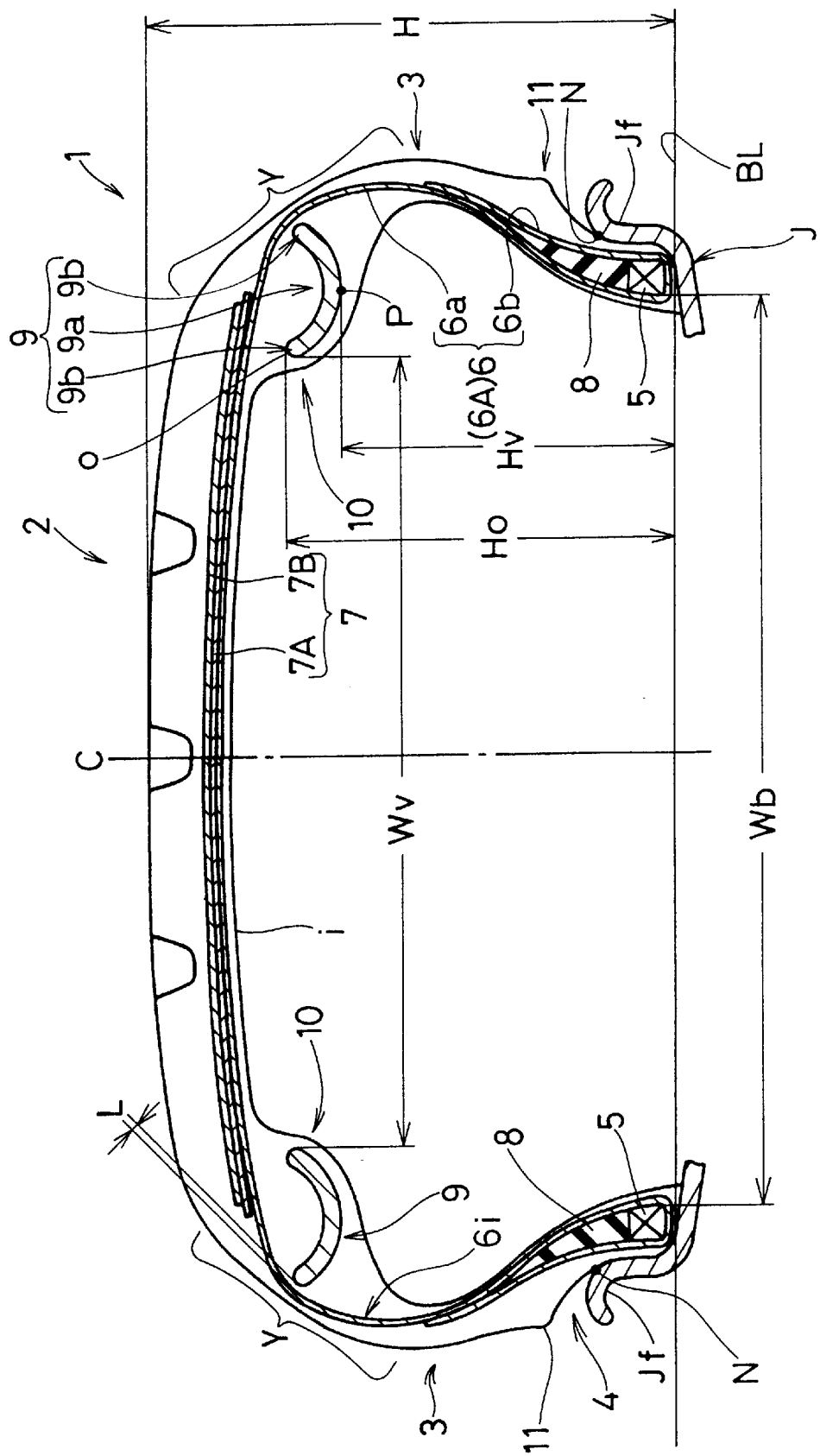
FIG. 1 is a cross sectional view of an embodiment of the present invention.

In FIG. 1, a run-flat tire 1 comprises a tread portion 2, a pair of axially spaced bead portions 4 with a bead core 5 therein, a pair of sidewall portions 3, a carcass 6 extending between the bead portions 4, and a belt disposed radially outside the carcass in the tread portion 2.

FIG. 1 shows a normally inflated state of the tire which is mounted on a standard wheel rim and inflated to a standard pressure, but loaded with no tire load. The dimensions explained later are measured in this state. Here, the standard wheel rim is the rim officially approved for the tire by, for example JATMA (Japan and Asia), T&RA (North America), ETRTO (Europe), STRO (Scandinavia) and the like, and the standard pressure and standard load are the maximum air pressure and the maximum tire load for the tire officially specified by the same association.

The carcass 6 comprises at least one, and in this embodiment only one, ply 6A of cords arranged radially at an angle of from 75 to 90 degrees with respect to the tire equator C and extending between the bead portions 4 through the tread portion 2 and sidewall portions 3 and turned up around the bead cores 5 from the axially inside to the outside of the tire to form a pair of turnup portions 6b and a main portion 6a therebetween.

For the carcass cords, organic fiber cords, e.g. polyester, nylon, rayon and the like are preferably used, but high elastic modulus cords such as aramid cord, steel cord and the like may be used.

Each of the bead portions is provided between the carcass turnup portion 6b and main portion 6a with a bead apex 8 made of hard rubber. The bead apex 8 extends and tapers radially outwardly from the bead core 5. The bead core 5 is usually made of a coiled steel wire, but high modulus organic cords may be used.

The belt includes a breaker 7 and optionally a band disposed radially outside the breaker 7.

The breaker 7 comprises at least two cross plies 7A and 7B of parallel cords laid at an angle of from 15 to 45 degrees with respect to the tire equator. For the breaker cords, steel cords are used in this embodiment, but organic fiber cords, e.g. aramid, rayon and the like may be used.

The band is made of at least one ply of a cord or cords, and the cord angle is not more than 5 degrees with respect to the tire equator C. For the band cord, a nylon cord is preferably used, but another material may be used.

According to the present invention, the tire is provided inside the carcass in each shoulder region Y with a stiff ring 9. Each ring 9 is embedded in a bulge of rubber 10 formed on the inside (i) of the tire.

The shoulder region Y is defined as a region within a radial height range between 45% and 90%, preferably between 50% and 80% of the tire section height H from the bead base line BL.

The ring 9 is made of a rigid material such as metallic materials, e.g. aluminum, soft iron, stainless steel and the like, fiber reinforced plastic materials (FRP), ceramics and the like.

Figure 2:
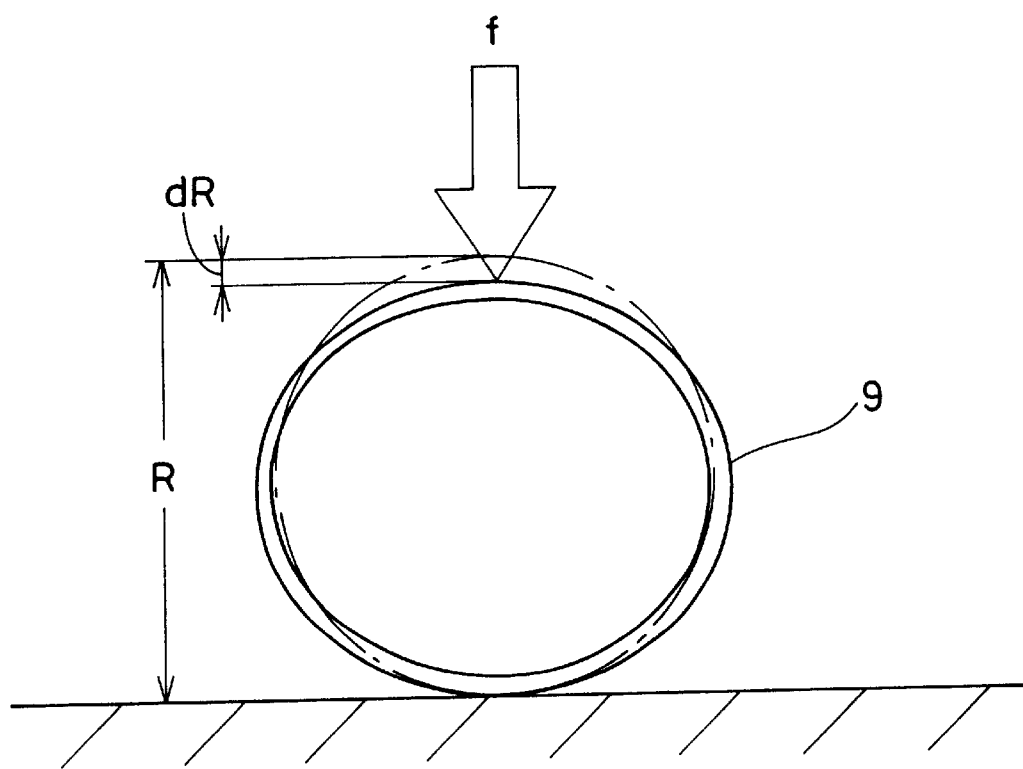
FIG. 2 is a schematic side view of the ring for explaining the required rigidity.

As shown in FIG. 2, when the ring 9 is pressed with 50% of the standard tire load, a displacement dR should be less than 15%, preferably less than 10%, more preferably less than 5% of the outside diameter R of the ring 9.

Figure 3A:
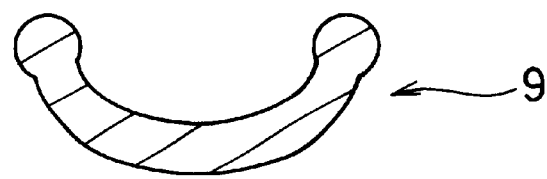
FIGS. 3(A) to (D) show examples of the cross sectional shape of the ring.
Figure 3B:
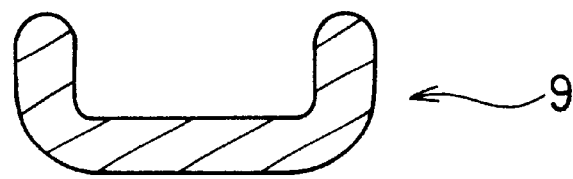
Figure 3C:
Figure 3D:
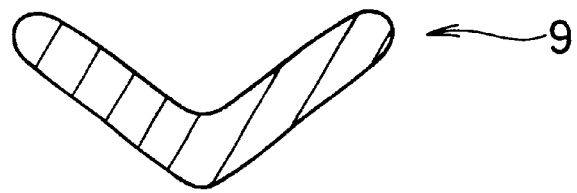

The ring 9 is completely round when viewed sideways and the cross sectional shape is generally a U or V shape which opens toward the radially outside and is geometrically symmetrical. In FIG. 1, the cross sectional shape of the ring 9 is an arc. Both the ends 9b are rounded, and the thickness is constant from one end 9b to the other 9b. FIG. 3(A) shows a modification of the example shown in FIG. 1, wherein the portion between the rounded ends is decreased in thickness. FIG. 3(B) shows a ring 9 of a U-shaped cross sectional shape which is composed of an axially extending central part and a pair of radially extending parts so as to withstand heavy loads. FIG. 3(C) shows a ring 9 of a hat shape which is composed of an arc-shaped central part and a pair of axially extending flange parts. FIG. 3(D) shows a ring 9 having a V-shaped sectional shape.

Referring to FIG. 1, the ring 9 is positioned such that the radial height Hv of the radially innermost point P is in the range of from 50 to 80% of the tire section height H. And the radial height Ho of the radially outermost point O is in the range of from 55 to 90% of the tire section height H. If the height Hv is less than 50%, vertical tire deflection increases. If the height Hv is more than 80%, ride comfort is liable to deteriorate.

The minimum rubber thickness L between the ring 9 and the carcass cords is set in the range of from 0.5 to 5.0 mm. In FIG. 1, the minimum thickness occurs at the axially outer end 9b. If the minimum thickness L is less than 0.5 mm, the carcass cords are wounded by the rings 9 during run flat and liable to be broken. If the minimum thickness L is more than 5.0 mm, the tire weight increases and dynamic performance deteriorates.

In this invention, the bulge 10 of rubber is provided in order to fix the ring 9 inside the tire and to prevent the ring from direct contacting with the carcass cords. Thus, it is not always necessary to use hard rubber. Preferably, a relatively soft and low-hysteresis-loss rubber is used To prevent the bead portions from unseating, the axial distance Wv between the two rings 9 is set to be smaller than the axial distance Wb between the bead cores 5, preferably 80 to 95% of Wb. And the carcass 6 has a convex profile from the axial ends of the breaker 7 to the radially outer ends of the bead apexes 8 to prevent the bead toe from lifting when the tire pressure decreases.

In this example, further, the outer surface of the lower sidewall portion is provided with an axially outwardly protruding rib 11 to prevent unseating of the bead portions. The rib 11 is formed to overhang flange Jf of the wheel rim J when the tire is mounted thereon. Therefore, vertical deformation, a pantographic motion about four fulcrums, two rings and two bead cores, and the like are reduced.

Figure 4:
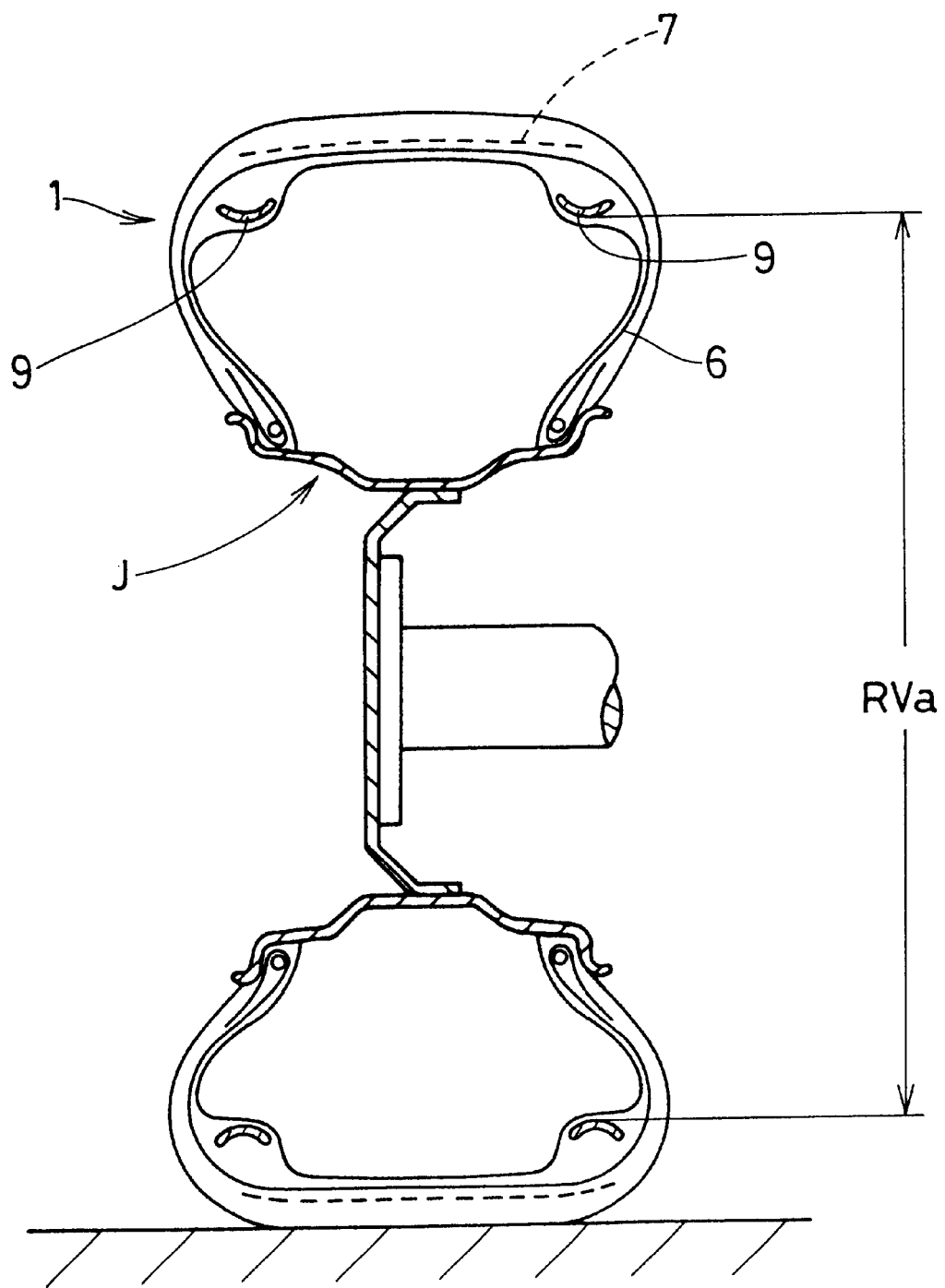
FIG. 4 is a cross sectional view of an assembly of the tire and a standard wheel rim under a normally inflated condition.

FIG. 4 shows a state in which the tire 1 is mounted on a standard wheel rim J and inflated to a standard pressure and loaded with a normal load. In this state, the load on the rings 9 is negligible, and the rings 9 maintain substantially the complete round and concentric with the axle. As the sidewall portions 3 are not provided with a hard rubber reinforcing layer as in the prior arts, the sidewall portions still maintain a shock absorbing function to provide a good ride comfort.

Figure 5:
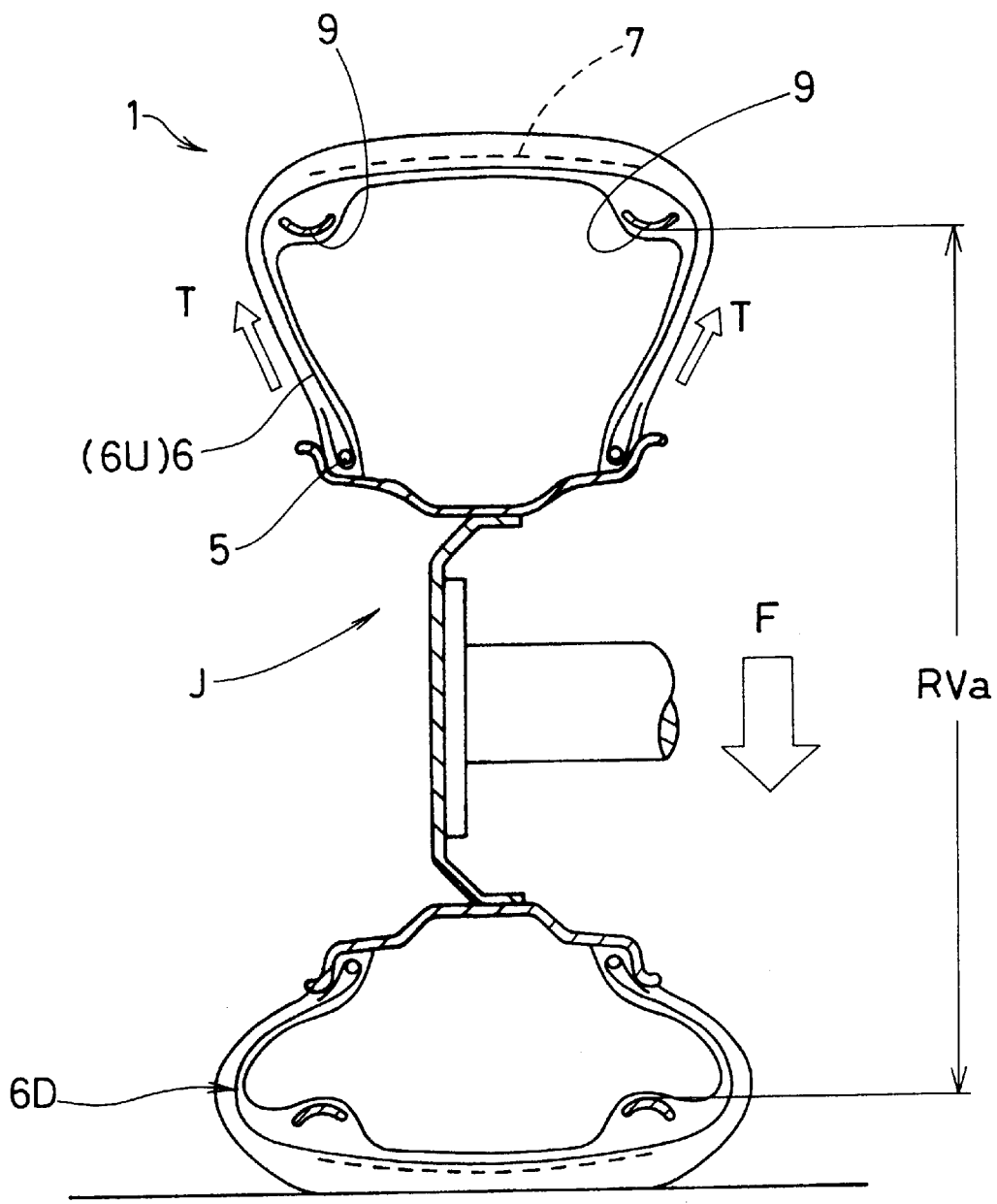
FIG. 5 is a cross sectional view of the assembly under a normally inflated condition.

If the tire pressure is decreased, although the rings 9 are somewhat deformed by the tire load, the rings 9 can support the tire load in such a way that the bead cores 5 are hung from the upper side of the rings 9 by the carcass cords just like a hub, rim and spokes. Accordingly, as shown in FIG. 5, an appropriate distance can be maintained between the wheel rim and the road surface, which means that the deformation of the sidewall portion under the wheel rim is greatly decreased and thus the run-flat performance, especially, a runable distance can be greatly improved.

If the axial distance between the axially outer ends of the rings 9 is smaller than the axial distance between the centers of the bead cores 5, the bead cores are pulled axially inwards, and the bead portions are liable to dislocate from the rim seats Thus, the former is set to be larger than the latter.

The above-mentioned bulge 10 of rubber in which the ring 9 is embedded is preferably united through a tire vulcanizing process. However, the following methods are also possible: (1) An assembly of a ring 9 and raw rubber for the bulge 10 is vulcanized separately from the tire main body, and the assembly is fixed on the inside of the tire main body by means of adhesive agents; and (2) The tire main body is first vulcanized, and to the inside of the tire main body the raw assembly is applied and then again they are vulcanized together.

What is claimed is:

1. A run-flat tire comprising a tread portion, a pair of sidewall portions, a pair of bead portion with a bead core therein, a carcass ply of cords extending between the bead portions through the tread portion and sidewall portions and turned up around the bead cores to be secured thereto, a pair of axially spaced rigid rings each disposed inside the carcass ply in one of the shoulder regions defined as regions within a radial height range between 45% and 90% of the tire section height from the bead base line measured when the tire is mounted on a standard rim and inflated to a standard pressure but loaded with no tire load.

2. The run-flat tire according to claim 1, wherein each said ring is embedded in a bulge of rubber formed on the inside of the tire.

3. The run-flat tire according to claim 1, wherein the rings are made of a metallic material.

4. The run-flat tire according to claim 1, wherein the rings are made of a fiber reinforced plastic material.

5. The run-flat tire according to claim 1, wherein each said ring has a generally U-shaped cross sectional shape which opens toward the radially outside of the tire.

6. The run-flat tire according to claim 1, wherein the radial height of the radially innermost point of the rings is in the range of from 50 to 80% of the tire section height.

7. The run-flat tire according to claim 1, wherein a minimum distance between each said ring and carcass cords adjacent thereto is in the range of from 0.5 to 5.0 mm.

* * * * *